(12) United States Patent
Boccuzzi et al.

(10) Patent No.: US 6,778,514 B1
(45) Date of Patent: Aug. 17, 2004

(54) SUBSPACE COMBINATION OF MULTISENSOR OUTPUT SIGNALS

(75) Inventors: Joseph Boccuzzi, Staten Island, NY (US); S. Unnikrishna Pillai, Harrington Park, NJ (US)

(73) Assignee: Cadence Design Systems, Inc., San Jose, CA (US)

( * ) Notice: Subject to any disclaimer, the term of this patent is extended or adjusted under 35 U.S.C. 154(b) by 941 days.

(21) Appl. No.: 09/584,270

(22) Filed: May 31, 2000

(51) Int. Cl.$^7$ .............................................. H04Q 7/100
(52) U.S. Cl. ..................... 370/334; 370/335; 370/514; 375/347; 455/137
(58) Field of Search ................................. 370/203, 252, 370/334, 329, 441, 335, 514, 342; 375/267, 347, 340, 316, 144, 130, 147, 148, 143, 152, 363–367; 455/132, 136, 137

(56) References Cited

U.S. PATENT DOCUMENTS 6,088,408 A * 7/2000 Calderbank et al. ........ 375/347
6,178,194 B1 * 1/2001 Vasic ......................... 375/136
6,304,750 B1 * 10/2001 Rashid-Farrokhi et al. . 455/137

* cited by examiner

*Primary Examiner*—Chi Pham
*Assistant Examiner*—Alexander O. Boakye
(74) *Attorney, Agent, or Firm*—Blakely Sokoloff Taylor Zafman LLP

(57) ABSTRACT

Method and system for recognizing the presence of a reference signal having M components. A signal s(t) is received that may contain a reference signal s(t;ref). An M×M covariance matrix of the M components of the received signal is formed, and M eigenvector solutions $V=V_j$ and associated eigenvalue solutions $\lambda=\lambda_j$ ($j=1, 2, \ldots, M$) of the matrix relation $R \cdot V = \lambda V$ are determined. A subspace S' of the space spanned, spanned by a selected subset of the vectors $V_{j'}$ ($j'=1, \ldots, N(s)$) is formed, with N(s) a selected number that is $\leq M$. Product signals $s(t) \cdot V_{j'}(t)$ are formed and integrated over a selected time interval, $t0 \leq t' \leq t$, to form estimation signals $x_{j'}(t)$ ($j'=1, \ldots, N(s)$). The estimation signal $x_{j'}(t)$ and the reference signal s(t;ref) are used to determine a weighting coefficient $w_{j'}(t)$ ($j'=1, \ldots, N(s)$), using a selected weighting criterion, and a sum signal of products of the weighting coefficients and the eigenvectors $V_{j'}(t)$ is formed, as an estimate of the reference signal contribution to the received signal.

24 Claims, 5 Drawing Sheets

SUBSPACE COMBINATION OF MULTISENSOR OUTPUT SIGNALS

FIELD OF THE INVENTION

This invention relates to communication of multisensor output signals in a noisy environment.

BACKGROUND OF THE INVENTION

Improvement of bit error rate (BER) in a wireless system for digital communications is an elusive goal, in part because the approaches used for such improvement often depend upon the present state of the communication channel. For example, use of multiple antennas for signal reception improves the BER, and a method known as Maximal Ratio Combining (MRC), which uses all signals received at all antennas, is often used with a spatial diversity approach. However, the MRC may operate poorly in a multi-user co-channel interference environment, where an adaptive antenna array (AAA) approach often performs better. One problem that must be faced in an AAA approach is the moment-by-moment assignment of weights to the different antennas.

Some workers have used the MRC and AAA approaches together for signal combining. The AAA method is preferred where CCI (interference) is present in the channel, and the MRC approach is preferred when CCI is largely or wholly absent. In any MRC/AAA combination approach, the signal receiver must sense, or be provided with, information on the channel environment in order to choose an optimal approach for the particular channel condition.

What is needed is a method that senses and rapidly adapts to a changing channel environment and selects a wireless communication mechanism that is optimal based on the present condition of a channel. Preferably, the method should react rapidly and automatically to any substantial change in certain channel parameters. Preferably, the method should perform better than either the MRC approach or the AAA approach, used by itself. Preferably, the method should be flexible enough to allow use of any reasonable cost function and to allow some enhancements to be incorporated into the mechanism without requiring that the system be first shut down, reconfigured, and reactivated.

SUMMARY OF THE INVENTION

These needs are met by the invention, which uses a decomposition of a vector space defined by a group of sensor signals into a desired signal subspace and a noise subspace for each of two analytical approaches (Maximal Ratio Combining and Adaptive Antenna Array), with each approach being optimal in situations that do not overlap with optimal situations for the other approach. The two approaches are combined in a common procedure, but only one of these approaches is used in a given situation.

The apparatus includes an MRC apparatus and AAA apparatus that relies upon signal decomposition into a desired signal subspace V(s) and the remainder, a noise subspace V(n). The desired signal is preferably a selected reference signal, such as a CDMA signal or a frame synchronization unique word signal.

DETAILED DESCRIPTION OF THE INVENTION

Figure 1:
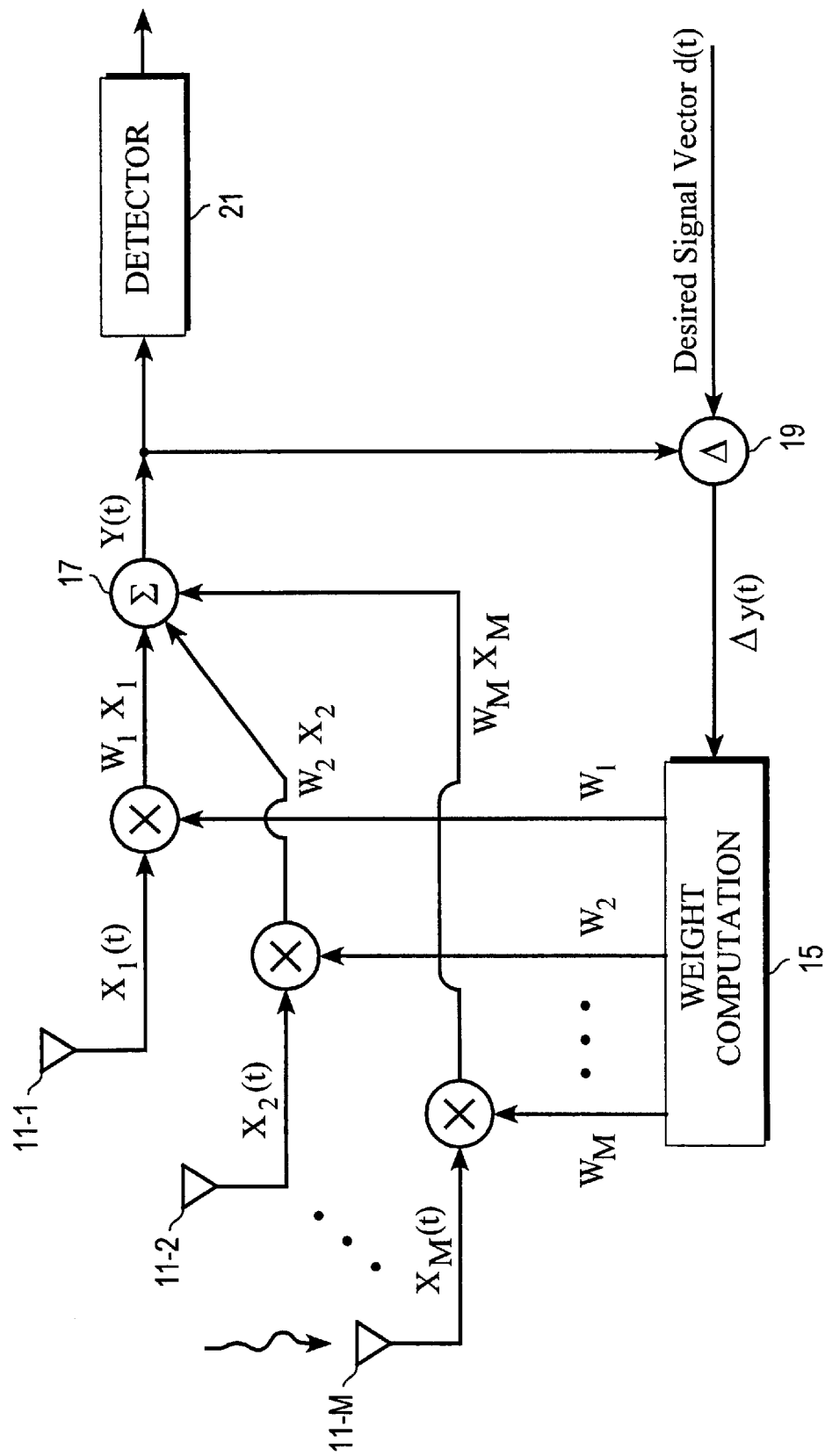
FIG. 1 illustrates multi-antenna apparatus suitable for practicing the invention in certain situations.

In order to illustrate use of the invention, a mean squared error (MSE) cost function is adopted for a combination of signals from multiple sensors. Assume that each set of q measurements, expressed as a vector z, can also be expressed as a linear combination of a known or constant vector x, having r components, plus a q-component noise vector v:

$$z = Hx + v, \qquad (1)$$

where H is a known q×r matrix containing the linear combination coefficients. The initial problem is to minimize a scalar error quantity $$\epsilon = (z - Hx)^{tr} J (z - Hx), \qquad (2)$$

where J is a selected q×q, positive definite weighting matrix (e.g., the identity matrix). From the development by A. Gelb in *Applied Optimal Estimation*, M.I.T. Press, Cambridge, Mass., 1992, pp. 102–103, one finds that an optimal choice of the measurement vector z is $$x = (H^{tr} J^{-1} H)^{-1} H^{tr} J^{-1} z \qquad (3)$$

In particular, where the matrix J is the identity matrix the optimal choice becomes $$x = R^{-1} H^{tr} z. \qquad (4)$$

$$R = H^{tr} H. \qquad (5)$$

Here, R is interpretable as an r×r covariance matrix for the received signal components. The matrix R is expressible as $$R = \sigma_S^2 h * h^{tr} + \sum_{i=1}^{p} \sigma_{I,i}^2 h_{I,i} * h_{I,i}^{tr} + \sigma_n^2 I, \qquad (6)$$

h = desired signal channel vector,
$h_I$ = interfering signal channel vector,
$\sigma_S^2$ = desired signal average power,
$\sigma_I^2$ = interfering signal average power,
$\sigma_I^2$ = noise average power,
p is the number of independent interfering signals, I is the identity matrix, and $h*h^{tr}$ behaves as an r×r projection operator. It is assumed here that all desired signals, interfering signals and noise signals are uncorrelated with each other.

Using the spectral decomposition theorem for a finite vector space (P. Lancaster and M. Tismenetsky, *The Theory of Matrices*, Academic Press, New York, 1985), the matrix R can be expressed in an alternative form as $$R = \sum_{j=1}^{M} \lambda_j V_j * V_j^{tr}, \qquad (7)$$

where M is the number of sensors employed, $\lambda_j$ is an eigenvalue associated with a corresponding eigenvector $V_j$. The matrix R satisfies $$R V_j = \lambda_j v_j (j = 1, 2, \ldots, M). \qquad (8)$$

The M-dimensional vector space V spanned by the eigenvectors $\{V_j\}$ can be decomposed into a desired signal sub-space V(s), of dimension N(s), and a "noise" sub-space V(n), of dimension N(n)=M−N(s), viz.

$$V = V(s) \oplus V(n),$$

where use of the $\oplus$ sign indicates that the spaces V(s) and V(n) are orthogonal or complementary to each other. The matrix R is then re-expressed in the form $$R = \sum_{j=1}^{N(s)} \lambda_j(s) V_j * V_j^{tr} \oplus \sum_{j=N(s)+1}^{M} \lambda_j(n) V_j * V_j^{tr}, \quad (9)$$

where the first sum includes only the desired signal sub-space, the second sum includes only the noise signal sub-space, and $V_j * V_j^{tr}$ is a projection operator onto a subspace associated with the eigenvector $V_j$. This is equivalent to replacing the matrix R by a modified matrix R', defined by $$R' = \sum_{j=1}^{N(s)} \lambda_j(s) V_j * V_j^{tr}, \quad (10)$$

in the subsequent calculations. The matrix R' is likely to be closer to the desired matrix, because the remaining contributions to the sum in Eq. (9) (namely, j=N(s)+1, ..., M) are independent noise contributions that may or may not be present at a given time. The collection of channels represented by the matrix R' will be a subset, often a proper subset, of the collection of channels represented by the matrix R.

Consider a spatial diversity situation involving M antennas, 11-j, (j=1, 2, ..., M), as illustrated in FIG. 1. The signal $x_j(t)$ received by the antenna 11-j, after appropriate amplification and filtering, is multiplied by a weight $w_j(t)$ in a multiplier module 13-j, and the weight $w_j(t)$ is computed by a weight computation module 15. A weighted scalar sum signal $$y(t) = \sum_{j=1}^{M} w_j(t) \cdot x_j(t) = w(t)^{tr} \cdot x(t) \quad (11)$$

is computed and issued as an output signal by an M-input adder 17. The sum output signal y is received by a negative input terminal of a difference module 19; a positive input terminal of the difference module 19 receives a desired or reference signal d(t). The difference module output signal $$\Delta y(t) = y(t) - d(t) \quad (12)$$

is received by the weight computation module 15.

The sum output signal y(t) is also received and analyzed by a signal detector 21 to determine whether the desired signal vector d(t) is (probably) being received. One possible criterion for a conclusion that the desired signal is being received is that the ratio $$\rho(t) = |y(t)| / \{\|w(t)\| \cdot \|x(t)\|\} \quad (13)$$

is at least equal to a selected positive fraction $\rho 0$ ($0 < \rho 0 < 1$), where $\|x\|$ is the Euclidean norm for the vector x.

One task here is to determine how the computation module should be arranged to provide optimal weights $w_j$ for the incoming sensor signals $x_j$. The weights $w_j$ are adjusted to achieve an extremum (minimum or maximum) of the chosen cost function $\epsilon$ in Eq. (2). By appropriately selecting the dimension N(s) of the desired signal subspace, it is possible to obtain an improved (reduced) BER parameter, relative to the BER achieved by conventional approaches. The component weights $w_j$ for the desired signal subspace V(s) are computed according to $$w(s) = \sum_{j=1}^{N(s)} (\lambda_j)^{-1} V_j * V_j^{tr} \cdot C(t; x; d; j), \quad (14)$$

where C(t;x;d;j) is a vector formed by cross correlation between each received signal component $x_j(t)$ and a corresponding component of the reference signal vector $d_j(t)$. Each vector $V_j * V_j^{tr} \cdot C(t;x;d;j)$ represents a projection of the present value of the cross correlation vector onto a subspace defined by the eigenvector $V_j$ in the subspace V(s). The remaining component weights $w_j$ (N(s)+1$\leq$j$\leq$M) for the noise subspace are preferably ignored here. The scalar sum y(t) is examined to determine whether the desired signal vector d(t) is present in the incoming signal vector x(t).

Figure 2:
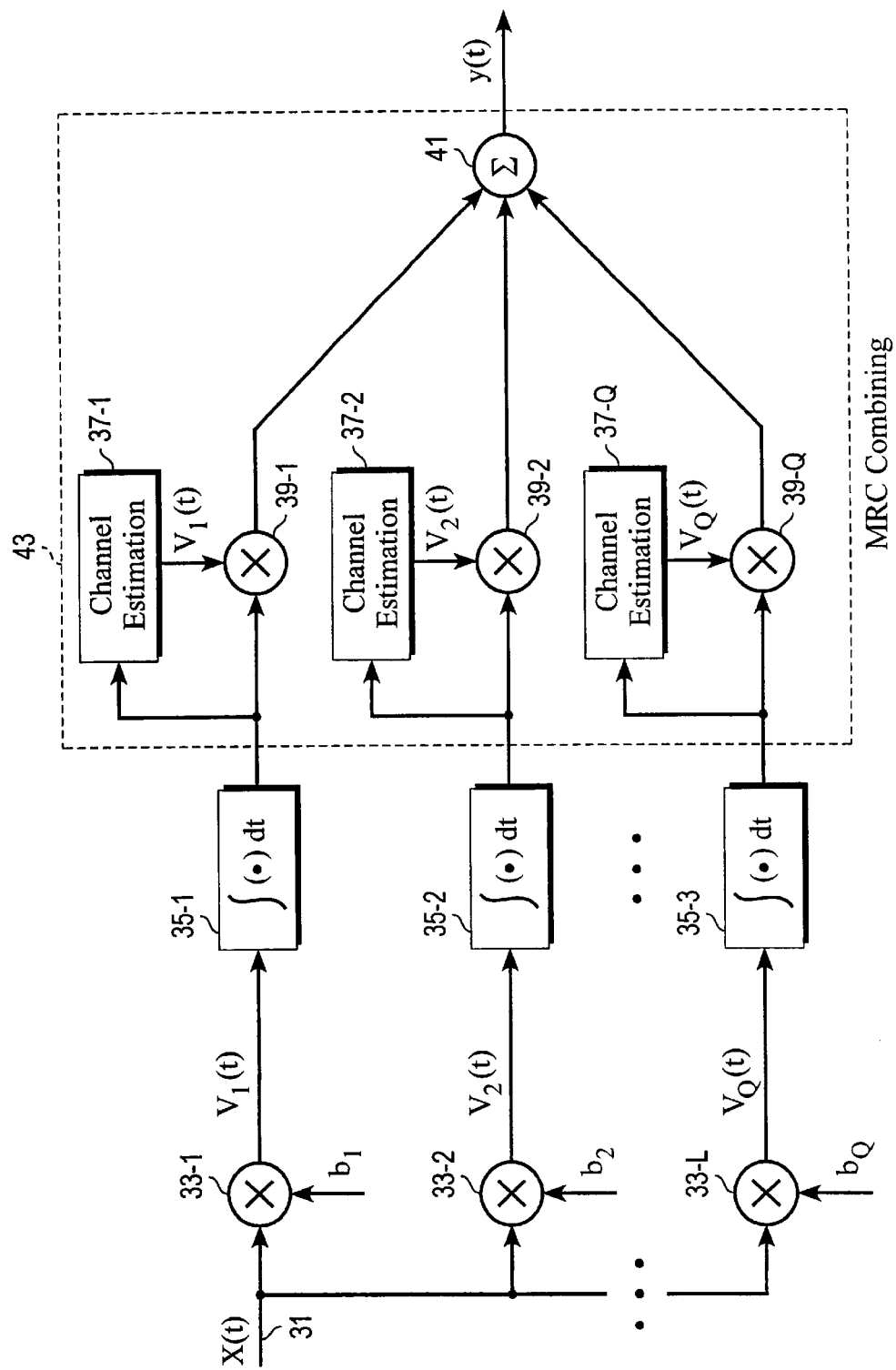
FIG. 2 illustrates multiple time sensing apparatus for practicing the invention.

FIG. 2 illustrates suitable apparatus for application of the invention to wideband CDMA. A signal x(t) is received along a signal line 31 at a first input terminal of each of Q multiplier modules 33-q (q=1, 2, ..., Q). A second input terminal of the multiplier module 33-q receives a selected, time-delayed signal $b_q(t-\tau_q)$ having a selected time delay $\tau_q$, and this multiplier module issues an output signal that is received and integrated with respect to time t by an integrator module 35-q. The integrator output signal is received by a channel estimation module 37-q and is also received by a first input terminal of a multiplier module 39-q. A second input terminal of the multiplier module 39-q receives an output signal $v_q(t)$ from the channel estimation module 37-q, and the multiplier module forms and issues the product of the two input signals. The output signals of the multiplier modules 39-q (q=1, 2, ..., Q) are summed in a summing module 41, and this sum is issued as an output signal y(t). A Maximal Ratio Combiner 43 includes the Q channel estimation modules 37-q, the Q multiplier modules 39-q and the summing module 41.

The weighting coefficients bq provided for the multiplier modules 33-q are chosen to maximize the signal-to-noise ratio (SNR) of the resulting signal y(t) according to the Maximal Ratio Combiner (MRC) criterion. It is well known that, in order to maximize the SNR of a weighted sum $$s(t) = \sum_{q=1}^{Q} b_q x_q(t), \quad (15)$$

the coefficients $b_q$ should be proportional to the strengths of the signals $x_q(t)$, where the strength of the signal $x_q(t)$ may be defined by integration over a selected time interval of a selected power (e.g., 2) of the magnitude of the signal $x_q(t)$ (D. G. Brennan, "On the Maximum Signal-to-noise ratio Realizable From Many Noisy Signals", Proc. I.R.E., vol. 43, 1955, 1530).

One method of obtaining this choice of coefficients is to configure each channel estimation module 37-q to receive a signal component $x_q(t)$ to estimate the strength associated with this signal component, and to provide a coefficient $b_q$ at the multiplier module 33-q that is proportional to this signal strength. Proceeding in this manner, one implements MRC signal processing, which is a preferred mode of processing when the incoming signal components are "frequency flat", with approximately uniform frequency spectrum (a Fourier transform of an incoming signal s(t)).

Figure 3:
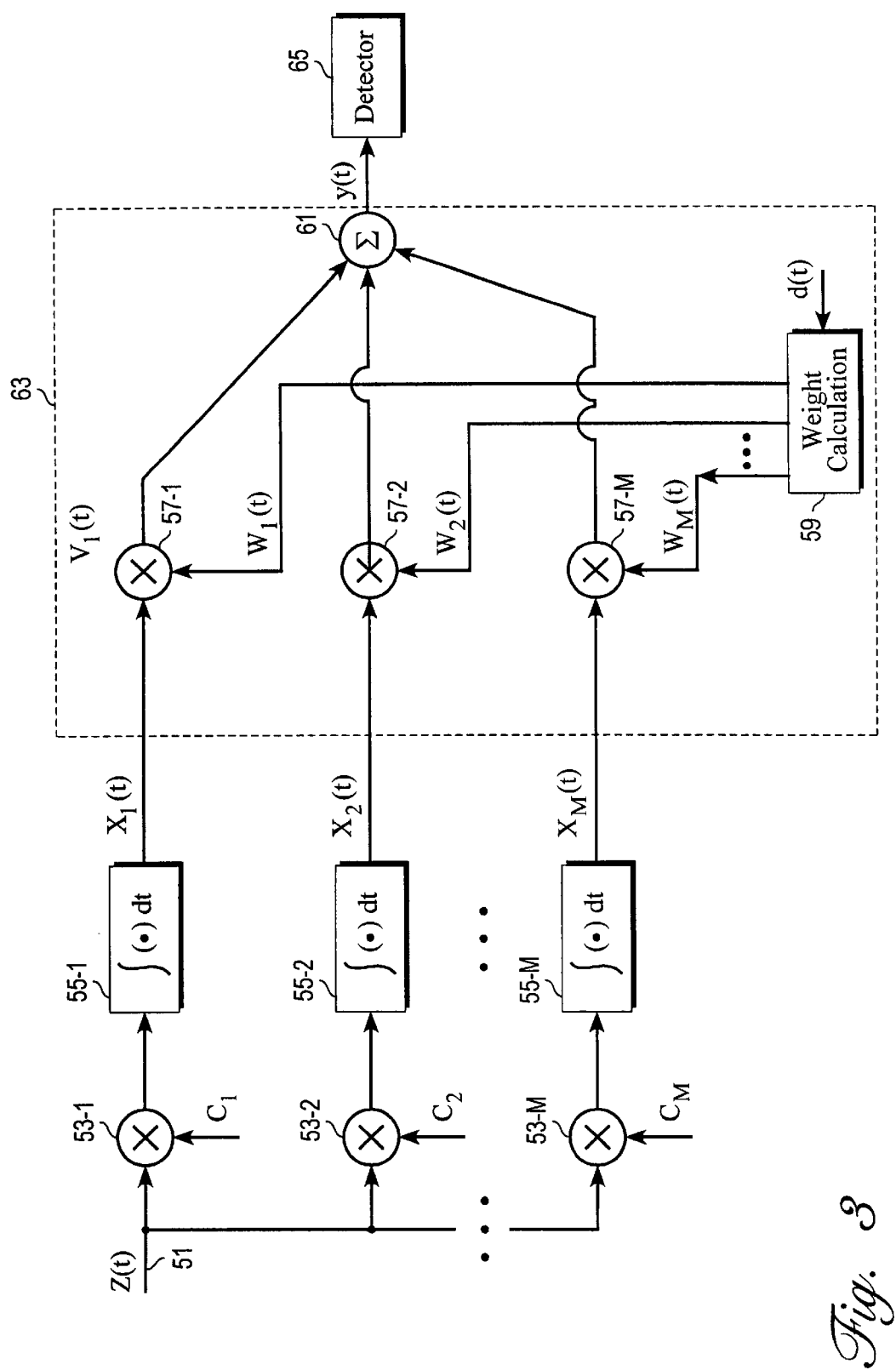
FIGS. 3, 4 and 5 illustrate embodiments of apparatus suitable for practicing the invention.

FIG. 3 illustrates subspace/combiner apparatus 50 suitable for practicing the invention. A vector signal z(t), including as many as M signal components $z_m(t)$ (preferably orthogonal, when integrated over a selected time interval) is received along a signal line 51 at a first input terminal of each of M multiplier modules 53-m (m=1, 2, ..., M), where M≧2. A second input terminal of the multiplier module 53-m receives a weighting coefficient $c_m(t)$, which may but need not depend upon time t, and the multiplier module issues an output signal that is received and integrated with respect to time t by an integrator module 55-m. Optionally, the weighting coefficients $c_m(t)$ can be chosen using channel estimation modules similar to those shown in FIG. 2.

The output signal $x_m(t)$ from an integrator signal 55-m is received by a weight calculation module 59 and is also received by a first input terminal of a multiplier module 57-m. A second input terminal of the multiplier module 57-m receives a weighting signal $w_m(t)$ from the weight calculation module 59, and the multiplier module 55-m forms and issues the product, $w_m(t) \cdot x_m(t)$, of the two input signals. The output signals from the multiplier modules 57-m are received at M input terminals of a summing module 61, whose output signal $$y(t) = \sum_{m=1}^{M} w_m(t) \cdot x_m(t) \qquad (16)$$

is a best-estimate match to a reference signal (CDMA, frame synchronization unique word, etc.). The multiplier modules 57-m, the weight calculation module 59 and the summing module 61 are components of a sub-space combiner 63 for practice of the invention. The output signal y(t) is passed through a detector module 65 to determine whether this signal is sufficiently close to a comparison or reference signal (desired signal or other selected signal) to indicate that the reference signal is (likely to be) contained in the incident signal x(t).

One suitable criterion for closeness of fit of the output signal y(t) and the reference signal d(t) forms a ratio of integrals, each taken over the same selected range, $$\chi = \{\int y(t') \cdot d(t')dt'\}^2 / \{\int y(t')^2 dt'\}\{\int d(t')^2 dt'\}, \qquad (17)$$

and compares this ratio with a selected positive threshold value $\chi 0$. The Schwartz inequality indicates that the ratio $\chi 0$ satisfies $0 \leq \chi \leq 1$ so that the threshold value $\chi 0$ is preferably chosen to be a number less than 1. If the ratio $\chi 0$ satisfies $\chi \geq \chi 0$, this is interpreted as indicating that the received signal z(t) contains a non-trivial contribution from the reference signal d(t).

Another suitable criterion for closeness of fit of the output signal y(t) and the reference signal d(t) forms a ratio of integrals, each taken over the same selected range, $$\mu(\alpha) = \int (y(t') - \alpha d(t'))^2 dt' / \{\{\int y(t')^2 dt'\}^{1/2} \{\int d(t')^2 dt'\}\}^{1/2}, \qquad (18)$$

determines a minimum value with respect to choice of the parameter α, and compares this ratio with a selected positive threshold value $\mu 0$. The minimum value is found to be $$\mu(\alpha)_{min} = \left( \left\{ \int y(t')^2 dt' \right\}^{1/2} / \left\{ \int d(t')^2 dt' \right\}^{1/2} \right) \{1 - \left\{ \int y(t') \cdot d(t')dt' \right\}^2 / \left\{ \int y(t')^2 dt' \right\} \left\{ \int d(t')^2 dt' \right\} \}, \qquad (19)$$

and this value, $\mu(\alpha)_{min}$, is compared with $\mu 0$. If the value $\mu(\alpha)_{min}$ satisfies $\mu(\alpha)_{min} \leq \mu 0$, this is interpreted as indicating that the received signal z(t) contains a non-trivial contribution from the reference signal d(t).

Other criteria for closeness of fit are provided by the well known coherent detection and differential detection techniques, for example, as discussed in B. Sklar, *Digital Communications*, Prentice Hall, Upper Saddle River, N.J., 1988, pp. 138–154, and G. Powell and in J. Boccuzzi, "Performance of π/4—QPSK Baseband Differential Detection Under Frequency Offset Conditions", I.E.E.E. Global Corn 1991, Phoenix, Ariz., 2–5 Dec. 1991, pp. 16.2.1–16.2.5.

Figure 4:
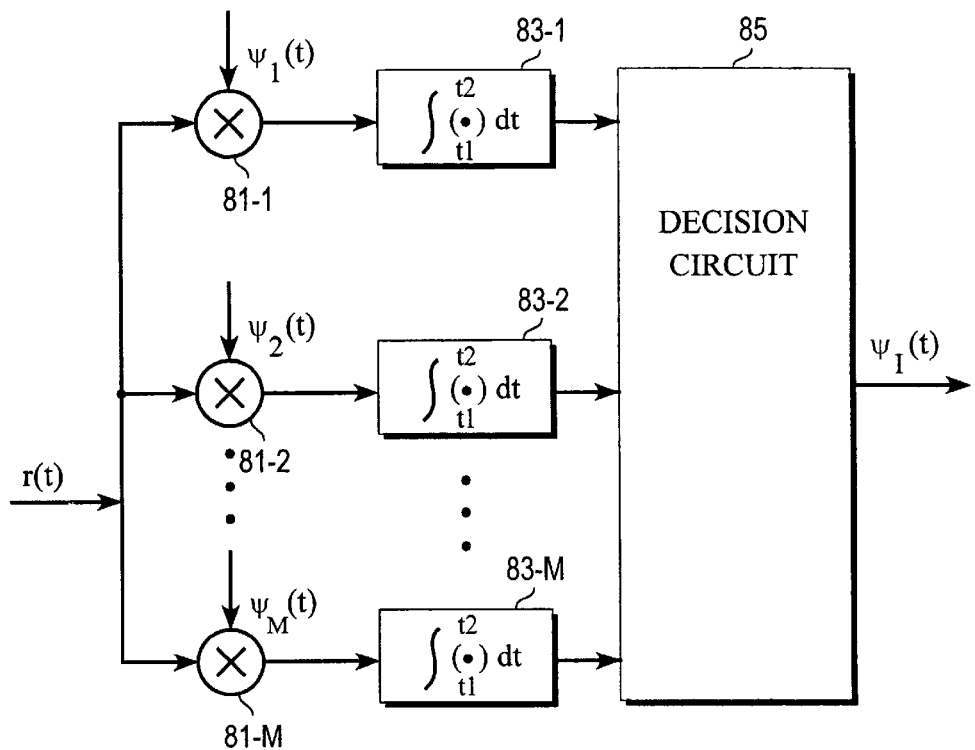

In one approach, coherent detection of presence/absence of one or more of a group of known basis signals $\{\psi_i(t)\}_i$ (i=1, 2, ..., M; M≧2) in a received signal r(t) relies on calculation of a sequence of coefficients $$c_i = \int_{t1}^{t2} y(t)\psi_i(t)dt/E_i, \qquad (20A)$$

$$E_i = \int_{t1}^{t2} \psi_i(t)^2 dt, \qquad (20B)$$

where $E_i$ is the mean square energy associated with the basis signal $104_i(t)$. If all basis signals have the same mean square energy $E_i$ ($E_i$=constant>0), the denominator in Eq. (20A) may be ignored or replaced by a constant (e.g., 1). Each of the coefficients $c_i$ is formed by a signal multiplier 81-i and an integrator 83-i, and a logic circuit 85 receives and compares the coefficients $c_i$ and determines which coefficient $c_i$ is the "best": which coefficient is either the largest, algebraically, or has the largest magnitude, as illustrated in FIG. 4. The basis signal $\psi_i(t)$ that has the best coefficient $c_i$ is interpreted to be the signal that is most likely to be present, among the chosen basis signals $\{\psi_i(t)\}_i$. This approach can be adapted for coherent detection of phase shift keyed (PSK) signals and for frequency shift keyed (FSK) signals, as discussed by B. Sklar, ibid.

It is usually implicitly assumed in coherent detection that the basis signals $\psi_i(t)$ are periodic (e.g., sinusoidal and/or cosinusoidal) and that any phase angle present in a transmitted signal is preserved in the received signal. In non-coherent of differential detection of a received signal, the phase angle is implicitly assumed to be a (slowly varying) random variable, and no attempt is made to determine this phase angle. If a transmitted basis signal $\psi_i(t)$ has the form $$\psi_i(t) = \cos\{\omega_0 t + \theta_i(t)\}, \qquad (21)$$

where $\omega_0$ is a selected angular frequency and $\theta_i(t)$ is a selected waveform, a corresponding received signal may be $$\phi_i(t) = \cos\{\omega_0 t + \theta_i(t) + \alpha(t)\}, \qquad (22)$$

where $\alpha(t)$ is an unknown phase angle that may vary slowly with time. In one approach to non-coherent detection, a message signal $\mu(k) = m(t=t_k)$ (k=1, 2, 3, ...) to be transmitted is first encoded using modulo-2 addition (without carry) with a known sequence c(k) to form a new sequence c'(k), $$c'(k) = \mu(k) \oplus c(k-1) \qquad (23A)$$

or $$c''(k) = \{\mu(k) \oplus c(k-1)\}^*, \qquad (23B)$$

wher * indicates the logical complement here. At the receiver, the process is inverted to an estimate of the original message $\mu(k)$:

$$\mu(k) = c(k) \oplus c'(k-1) \qquad (24A)$$

or $$\mu(k) = \{c(k) \oplus c''(k-1)\}^*. \qquad (24B)$$

Figure 5:
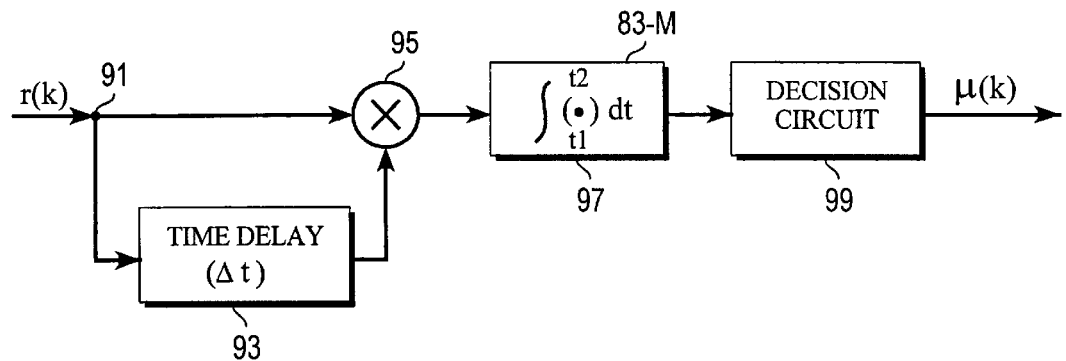

FIG. 5 illustrates a simplified method of implementing non-coherent signal detection. A signal stream r(k) is received at an input terminal 91, and a first replica is received at a multiplier 95 and multiplied by a seed value. a second replica of the signal stream is delayed in time by a selected time delay At in a time delay module 93, and the resulting time-delayed value r(k−1) (replacing the seed value used for to form the first product) is received at the multiplier 95 and multiplied by later-received value, such as r(k). The resulting product is received and integrated by an integrator circuit 97. The resulting integrated product is received and analyzed by a decision circuit 99. The resulting signal $\mu(k)$ issues as an estimate of the transmitted signal. Other approaches to coherent and non-coherent detection of a received signal can also be used here.

The weight calculation module 59 in FIG. 3 receives the signal components $x_m(t)$ at M input terminals and receives a reference signal vector d(t) at another input terminal. Adopting the subspace-combining approach that was discussed in the preceding, the vector component weights $w_m(t)$ are computed as in Eq. (14), where only contributions from a desired signal space V(s) are considered.

The dimension N(s) ($\leq$M) of the desired signal subspace V(s) is determined from other considerations. By construction, each eigenvector $V_j$ of the covariance matrix R in the noise subspace (j=N(s)+1, . . . , M) satisfies an orthogonality condition $$V_j^{tr} \cdot Q = 0, \quad (25)$$

where Q may be a modification of the matrix R in the subspace spanned by the desired signal space eigenvectors $V_j$(j=1, . . ., N(s)), for example, the modification R' set forth in Eq. (10).

In practice, the covariance matrix R (or R' or Q) must be estimated, using the incoming signal vector components $x_m$ (t). Using a conventional AAA approach produces a noise-like sum with a corresponding BER value. By focusing on a subspace V(s), spanned by the vector components of the reference signal, the average value of a noise-like additional term can be reduced, and the corresponding BER value is likewise reduced.

Preferably, a signal receiver will estimate the dimension M (or V(S)) of the signal subspace corresponding to the matrix R (or R') using rank estimation and a selected finite basis set of signal functions $\{s_k(t)\}_k$. The receiver's task here will be made easier if the transmitter and receiver use a common, and agreed upon, basis set for the signal functions, such as a finite set of trigonometric functions or Legendre polynomials (finite time interval) or Laguerre or Hermite polynomials (infinite time interval).

Figure 6:
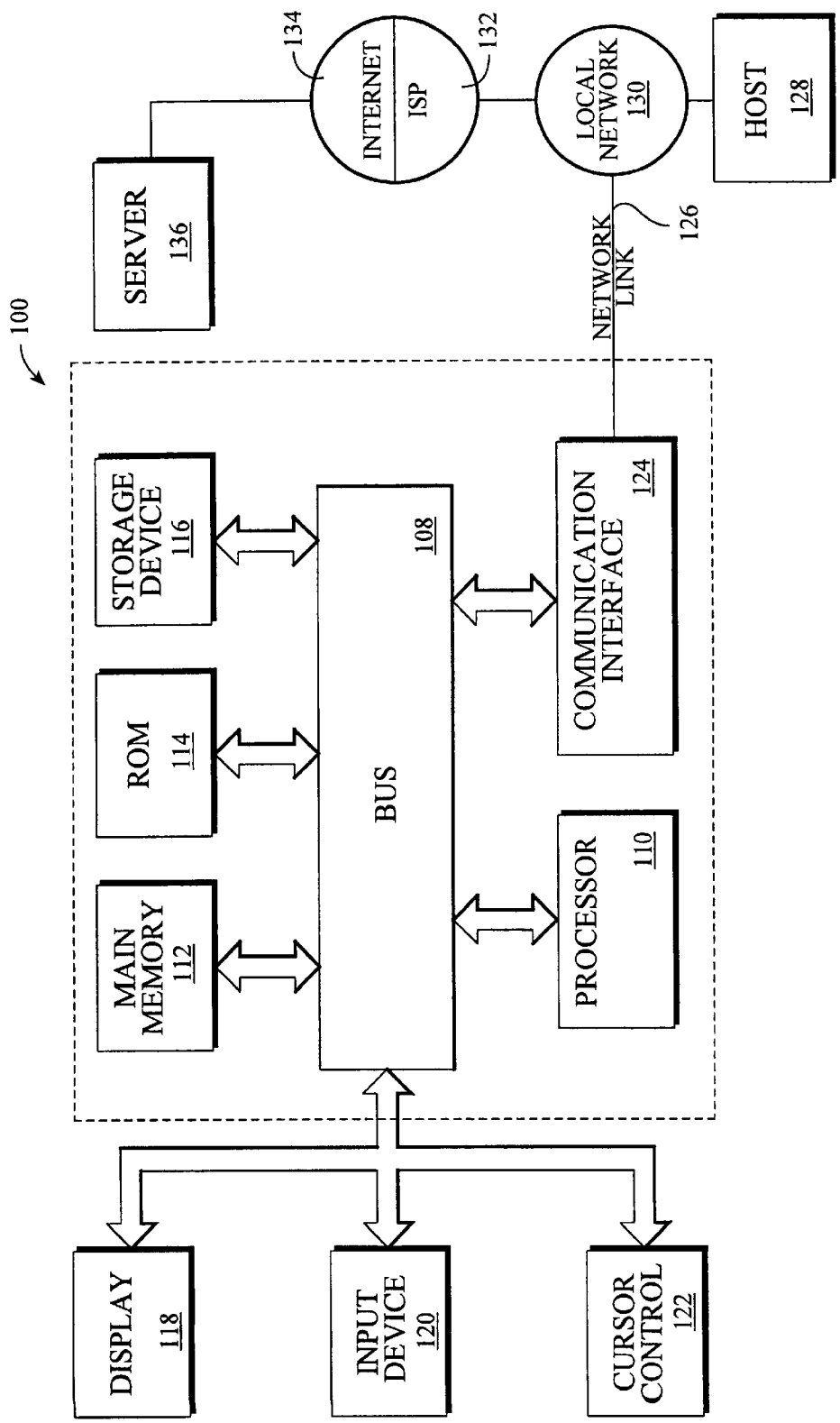
FIG. 6 is a block diagram illustrating a computer system suitable for practicing the invention.

FIG. 6 shows a block diagram of a general computer system 100, which may be used to implement various hardware components of the invention, such as a client an applications server and a database management system. The computer system 100 includes a bus 108 or other communication mechanism for communicating information and a processor 110, coupled with the bus 108, for processing information. The computer system 100 also includes a main memory 112, such as a random access memory (RAM) or other dynamic storage device, coupled to the bus 108, for storing information and instructions to be executed by the processor 110. The main memory 112 also may be used for storing temporary variables or other intermediate information during execution of instructions by the processor 110. The computer system 100 further optionally includes read only memory (ROM) 114 or other static storage device, coupled to the bus 108, for storing static information and instructions for the processor 110. A storage device 116, such as a magnetic disk or optical disk, is provided and is coupled to the bus 108 for storing information and instructions.

The computer system 100 may also be coupled through the bus to a display 118, such as a cathode ray tube (CRT), for displaying information to a computer user. An input device 120, including alphanumeric and other keys, is coupled to the bus for communicating information and commands to the processor 110. Another type of user input device is a cursor control 122, such as a mouse, a trackball or cursor direction keys for communicating direction information and command selections to the processor 110 and for controlling cursor movement on the display 118. This input device typically has one degree of freedom in each of two axes, such as x- and y-axes, that allows the device to specify locations in a plane.

The functionality of the invention is provided by the computer system 100 in response to the processor 110 executing one or more sequences of instructions contained in main memory 112. These instructions may be read into main memory 112 from another computer-readable medium, such as a storage device 116. Execution of the sequences of instructions contained in the main memory 112 causes the processor 110 to perform the process steps described herein. In alternative embodiments, hard-wired circuitry may be used in place of, or in combination with, software instructions to implement the invention. Embodiments of the invention are not limited to any specific combination of hard-wired circuitry and software.

The term "computer-readable medium", as used herein, refers to any medium that participates in providing instructions to the processor 110 for execution. This medium may take many forms, including but not limited to non-volatile media, volatile media and transmission media. Non-volatile media includes, for example, optical and magnetic disks, such as the storage disks 116. Volatile media includes dynamic memory 112. Transmission media includes coaxial cables, copper wire and fiber optics and includes the wires that are part of the bus 108. Transmission media can also take the form of acoustic or electromagnetic waves, such as those generated during radiowave, infrared and optical data communications.

Common forms of computer-readable media include, for example, a floppy disk, a flexible disk, a hard disk, magnetic tape or any other magnetic medium, a CD-ROM, any other optical medium, punchcards, papertape, any other physical medium with patterns of holes or apertures, a RAM, a ROM, a PROM, an EPROM, a Flash-EPROM, any other memory chip or cartridge, a carrier wave as described hereinafter, or any other medium from which a computer can be read.

Various forms of computer-readable media may be involved in carrying out one or more sequences of one or more instructions to the processor 110 for execution. For example, the instructions may initially be carried on a magnetic disk of a remote computer. The remote computer can load the instructions into its dynamic memory and send the instructions over a telephone, using a modem. A modem local to the computer system 100 can receive data over a telephone line and use infrared transmitter to convert and transmit the data to the an infrared detector connected to the computer system bus. The bus will carry the data to the main memory 112, from which the processor receives and executes the instructions. Optionally, the instructions receive by the main memory 112 can be stored on the storage device 116, either before or after execution by the processor 110.

The computer system 100 also includes a communications interface 124, coupled to the bus 108, which provides two-way data communication coupling to a network link 126 that is connected to a local area network (LAN) or to a wide area network (WAN). For example, the communications interface 124 may be an integrated services digital network (ISDN) card or a modem to provide a data communication connection to a corresponding type of telephone line. As another example, the communications interface 124 may be a local area network card to provide a data communication connection to a compatible LAN. Wireless links may also be implemented. In any such implementation, the communications interface 124 sends and receives electrical, electromagnetic or optical signals that carry digital data streams representing various types of information.

The network link 126 typically provides data communication through one or more networks to other data devices. For example, the data link 126 may provide a connection through an LAN 128 to a host computer 130 or to data equipment operated by an Internet Service Provider (ISP) 132. The ISP, in turn, provides data communication services through the world wide packet data communication network, now commonly known as the "Internet" 134, served by one or more servers 136. The LAN 128 and the Internet 134 both use electrical, electromagnetic and/or optical signals to carry the digital data streams. The signals carried by these network, the signals carried on the network link 126 and the signals carried on the communications interface 124, are examples of carrier waves that transport the information.

What is claimed is:

1. A method for recognition of a reference signal in a signal having M signal components (M≧2), the method comprising:

receiving a signal s(t) that may contain a reference signal s(t;ref);

providing an M×M covariance matrix R of the M received signal components, and providing M selected eigenvector solutions $V=V_j$ and associated eigenvalue solutions $\lambda=\lambda_j$ (j=1, 2, . . . , M) of the matrix relation R·V=λV;

selecting a subspace S' spanned by a selected subset of the vectors $V_{j'}$ (j'=1, . . . , N(s)), with N(s) a selected number that is ≦M;

forming and integrating a product signal $s(t)·V_{j'}(t)$ over a selected time interval, t0≦t'≦t, to form an estimation signal $x_{j'}(t)$ for each of j'=1, . . . , N(s); and using the estimation signal $x_{j'}(t)$ and the reference signal s(t;ref) to determine a weighting coefficient $w_{j'}(t)$ (j'=1, . . . , N(s)), using a selected weighting criterion, and forming a sum signal $$y(t) = \sum_{j'=1}^{N(s)} w_{j'}(t) \cdot V_{j'}(t); \text{ and}$$

as an estimate of the reference signal contribution to the received signal.

2. The method of claim 1, further comprising:

comparing said sum signal to said reference signal and generating a numerical value that is a measure of closeness of fit between the received signal and the reference signal; and interpreting said sum signal as an acceptable estimate of said reference signal contribution to said received signal when the numerical value is at least equal to a selected threshold value.

3. The method of claim 2, wherein said steps of comparing said sum signal to said reference signal and interpreting said sum signal as an acceptable estimate comprise:

forming a ratio χ of integrals, all taken over a selected range, defined by $$\chi = (\int y(t') \cdot s(t';\text{ref}) dt')^2 / \{\int y(t')^2 dt'\}^{1/2} \{\int s(t';\text{ref})^2 dt'\}; \text{ and}$$

when the ratio χ is at least equal to a selected positive threshold value χ0, interpreting this condition as indicating that said sum signal is an acceptable estimate of said reference signal contribution to said received signal.

4. The method of claim 1, further comprising:

comparing said sum signal to said reference signal and generating a numerical value that is a measure of closeness of fit between the received signal and the reference signal; and interpreting said sum signal as an acceptable estimate of said reference signal contribution to said received signal when the numerical value is at most equal to a selected threshold value.

5. The method of claim 4, wherein said steps of comparing said sum signal to said reference signal and interpreting said sum signal as an acceptable estimate comprise:

forming a ratio μ of integrals, all taken over a selected range, defined by $$\mu(\alpha) = \int (y(t') - \alpha \cdot s(t';\text{ref}))^2 dt' / \{\{\int y(t)^2 dt'\}^{1/2} \{\int s(t';\text{ref})^2 dt'\}\}^{1/2},$$

where α is a real parameter;

minimizing μ(α) with respect to α and determining the minimum value, $\mu(\alpha)_{min}$, of μ(α); and when the ratio $\mu(\alpha)_{min}$ is at most equal to a selected positive threshold value μ0, interpreting this condition as indicating that said sum signal is an acceptable estimate of said reference signal contribution to said received signal.

6. The method of claim 5, further comprising choosing said minimum value $\mu(\alpha)_{min}$ to be $$\mu(\alpha)_{min} = \left(\left\{\int y(t')^2 dt'\right\}^{1/2} / \left\{\int d(t')^2 dt'\right\}^{1/2}\right)\left\{1 - \left\{\int y(t') \cdot d(t') dt'\right\}^2 / \left\{\int y(t')^2 dt'\right\}\left\{\int d(t')^2 dt'\right\}\right\}.$$

7. The method of claim 1, further comprising:

performing coherent detection on said received signal and identifying at least one of said eigenvector solutions $V_j$ that is preferred relative to all other of said eigenvector solutions; and interpreting said received signal as including the preferred eigenvector solution.

8. The method of claim 1, further comprising the step of choosing said selected number N(s) to be equal to M.

9. The method of claim 1, further comprising the step of choosing said selected number N(s) to be no larger than M−1.

10. A system for recognition of a reference signal in a signal having M signal components (M≧2), the system comprising a computer that is programmed:

to receive a signal s(t) that may contain a reference signal s(t;ref);

to provide an M×M covariance matrix R of the M received signal components, and to provide M selected eigenvector solutions $V=V_j$ and associated eigenvalue solutions $\lambda=\lambda_j$ (j=1, 2, . . . , M) of the matrix relation $R \cdot V = \lambda\ V$;

to select a subspace S' spanned by a selected subset of the vectors $V_{j'}$(j'=1, . . . , N(s)), with N(s) a selected number that is $\leq M$;

to form and integrate a product signal $s(t) \cdot V_{j'}(t)$ over a selected time interval, $t0 \leq t' \leq t$, and to form an estimation signal $x_{j'}(t)$ for each of j'=1, . . . , N(s); and to use the estimation signal $x_{j'}(t)$ and the reference signal s(t;ref) to determine a weighting coefficient $w_{j'}(t)$ (j'= 1, . . . , N(s)), using a selected weighting criterion, and to form a sum signal $$y(t) = \sum_{j'=1}^{N(s)} w_{j'}(t) \cdot V_{j'}(t); \text{ and}$$

as an estimate of the reference signal contribution to the received signal.

11. The system of claim 10, wherein said computer is further programmed:

to compare said sum signal to said reference signal and to generate a numerical value that is a measure of closeness of fit between said received signal and said reference signal; and to interpret said sum signal as an acceptable estimate of said reference signal contribution to said received signal when the numerical value is at least equal to a selected threshold value.

12. The system of claim 11, wherein said computer is further programmed:

to form a ratio 102 of integrals, all taken over a selected range, defined by $$\chi = (\int y(t') \cdot s(t';\text{ref})\ dt')^2 / \{\int y(t')^2 dt'\}^{1/2} \{\int s(t';\text{ref})^2 dt'\}; \text{ and}$$

when the ratio $\chi$ is at least equal to a selected positive threshold value $\chi 0$, to interpret this condition as indicating that said sum signal is an acceptable estimate of said reference signal contribution to said received signal.

13. The system of claim 10, wherein said computer is further programmed:

to compare said sum signal to said reference signal and to generate a numerical value that is a measure of closeness of fit between the received signal and the reference signal; and to interpret said sum signal as an acceptable estimate of said reference signal contribution to said received signal when the numerical value is at most equal to a selected threshold value.

14. The system of claim 10, wherein said computer is further programmed:

to form a ratio $\mu$ of integrals, all taken over a selected range, defined by $$\mu(\alpha) = \int (y(t') - \alpha s(t';\text{ref}))^2 dt' / \{\{\int y(t')^2 dt'\}^{1/2} \{\int s(t';\text{ref})^2 dt'\}\}^{1/2},$$

where $\alpha$ is a real parameter;

to minimize $\mu(\alpha)$ with respect to $\alpha$ and determining the minimum value, $\mu(\alpha)_{min}$, of $\mu(\alpha)$; and when the ratio $\mu(\alpha)_{min}$ is at most equal to a selected positive threshold value $\mu 0$, to interpret this condition as indicating that said sum signal is an acceptable estimate of said reference signal contribution to said received signal.

15. The system of claim 14, wherein said computer is further programmed to choose said minimum value $\mu(\alpha)_{min}$ to be $$\mu(\alpha)_{min} = \left(\left\{\int y(t')^2 dt'\right\}^{1/2} / \left\{\int d(t')^2 dt'\right\}^{1/2}\right)\left\{1 - \left\{\int y(t') \cdot d(t') dt'\right\}^2 / \left\{\int y(t')^2 dt'\right\}\left\{\int d(t')^2 dt'\right\}\right\}.$$

16. The system of claim 10, wherein said computer is further programmed:

to perform coherent detection on said received signal and identifying at least one of said eigenvector solutions $V_j$ that is preferred relative to all other of said eigenvector solutions; and to interpret said received signal as including the preferred eigenvector solution.

17. The system of claim 10, wherein said computer is further programmed to choose said selected number N(s) to be equal to M.

18. The system of claim 10, wherein said computer is further programmed to choose said selected number N(s) to be no large than M−1.

19. A computer program product comprising a computer storage medium and a computer program code mechanism embedded in the computer storage mechanism for enabling recognition of a reference signal in a signal having M signal components (M$\geq$2), the computer program code mechanism comprising:

a first computer code device, configured to receive a signal s(t) that may contain a reference signal s(t;ref);

a second computer code device, configured to provide an M×M covariance matrix R of the M received signal components, and to provide M selected eigenvector solutions $V=V_j$ and associated eigenvalue solutions $\lambda=\lambda_j$ (j=1, 2, . . . , M) of the matrix relation $R \cdot V = \lambda V$;

a third computer code device, configured to select a subspace S' spanned by a selected subset of the vectors $V_{j'}$ (j'=1. . . , N(s)); with N(s) a selected number that is $\leq M$;

a fourth computer code device, configured to form and integrate a product signal $s(t) \cdot V_{j'}(t)$ over a selected time interval, $t0 \leq t' \leq t$, to form an estimation signal $x_{j'}(t)$ for each of j'=1, . . . , N(s); and a fifth computer code device, configured to use the estimation signal $x_{j'}(t)$ and the reference signal s(t;ref) to determine a weighting coefficient $w_{j'}(t)$ (j'=1, . . . , N(s)), using a selected weighting criterion, and forming a sum signal $$y(t) = \sum_{j'=1}^{N(s)} w_{j'}(t) \cdot V_{j'}(t); \text{ and}$$

as an estimate of the reference signal contribution to the received signal.

20. The computer program product of claim 19, wherein said fifth computer code device is further configured to compare said sum signal to said reference signal and to generate a numerical value that is a measure of closeness of fit between the received signal and the reference signal; and to interpret said sum signal as an acceptable estimate of said reference signal contribution to said received signal when the numerical value is at least equal to a selected threshold value.

21. The computer program product of claim 20, wherein said fifth computer code device is further configured:

to form a ratio $\chi$ of integrals, all taken over a selected range, defined by $$\chi = (\int y(t') \cdot s(t';\text{ref}) dt')^2 / \{\int y(t')^2 dt'\}^{1/2} \{\int s(t';\text{ref})^2 dt'\}; \text{ and}$$

when the ratio $\chi$ is at least equal to a selected positive threshold value $\chi 0$, to interpret this condition as indicating that said sum signal is an acceptable estimate of said reference signal contribution to said received signal.

22. The computer program product of claim 19, wherein said fifth computer code device is further configured to compare said sum signal to said reference signal and to generate a numerical value that is a measure of closeness of fit between the received signal and the reference signal; and to interpret said sum signal as an acceptable estimate of said reference signal contribution to said received signal when the numerical value is no greater than a selected threshold value.

23. The computer program product of claim 22, wherein said fifth computer code device is further configured:

to form a ratio $\mu$ of integrals, all taken over a selected range, defined by $$\mu(\alpha) = \int (y(t') - \alpha \cdot s(t';\text{ref}))^2 dt' / \{\{\int y(t')^2 dt'\}^{1/2} \{\int s(t';\text{ref})^2 dt'\}\}^{1/2},$$

where $\alpha$ is a real parameter;

to minimize $\mu(\alpha)$ with respect to $\alpha$ and to determine the minimum value, $\mu(\alpha)_{min}$, of $\mu(\alpha)$; and when the ratio $\mu(\alpha)_{min}$ is at most equal to a selected positive threshold value $\mu 0$, to interpret this condition as indicating that said sum said reference signal contribution to said received signal.

24. The computer program product of claim 23, wherein said fifth computer code device is further configured to choose said minimum value $\mu(\alpha)_{min}$ to be $$\mu(\alpha)_{min} = \left(\left\{\int y(t')^2 dt'\right\}^{1/2} / \left\{\int d(t')^2 dt'\right\}^{1/2}\right)\left\{1 - \left\{\int y(t') \cdot d(t') dt'\right\}^2 / \left\{\int y(t')^2 dt'\right\}\left\{\int d(t')^2 dt'\right\}\right\}.$$

* * * * *